G. M. WEBSTER.
SEED CLEANER.
APPLICATION FILED AUG. 3, 1912.

1,092,191.

Patented Apr. 7, 1914.
2 SHEETS—SHEET 2.

Witnesses
C. K. Davis
H. A. Phillips

Inventor
G. M. Webster
By Thurman Harney
ATTY.

UNITED STATES PATENT OFFICE.

GEORGE M. WEBSTER, OF FORT DODGE, IOWA.

SEED-CLEANER.

1,092,191.

Specification of Letters Patent.  Patented Apr. 7, 1914.

Application filed August 3, 1912. Serial No. 713,109.

*To all whom it may concern:*

Be it known that I, GEORGE M. WEBSTER, a citizen of the United States, residing at Fort Dodge, in the county of Webster and State of Iowa, have invented certain new and useful Improvements in Seed-Cleaners, of which the following is a specification.

The present invention relates to improvements in seed cleaners, and is designed especially for the purpose of cleaning clover seed after the seed have been threshed and separated from the straw.

During the process of threshing the clover seed from the straw, it frequently happens that the seeds of weeds as plantain and buckthorn, which are approximately the size of clover seed, become mixed with the clover seed, and the object of my invention is the provision of means for separating, by an additional process or operation, the clover seed from the weed seeds.

The weed seeds which pass through a screen during the operation of threshing the clover have a beard growing therefrom, and my invention consists essentially in providing means for adjusting the parts for carrying off the weed seeds.

In the accompanying drawings I have illustrated one complete example of the physical embodiment of my invention constructed according to the best mode I have so far devised for the practical application of the principles.

Figure 1:
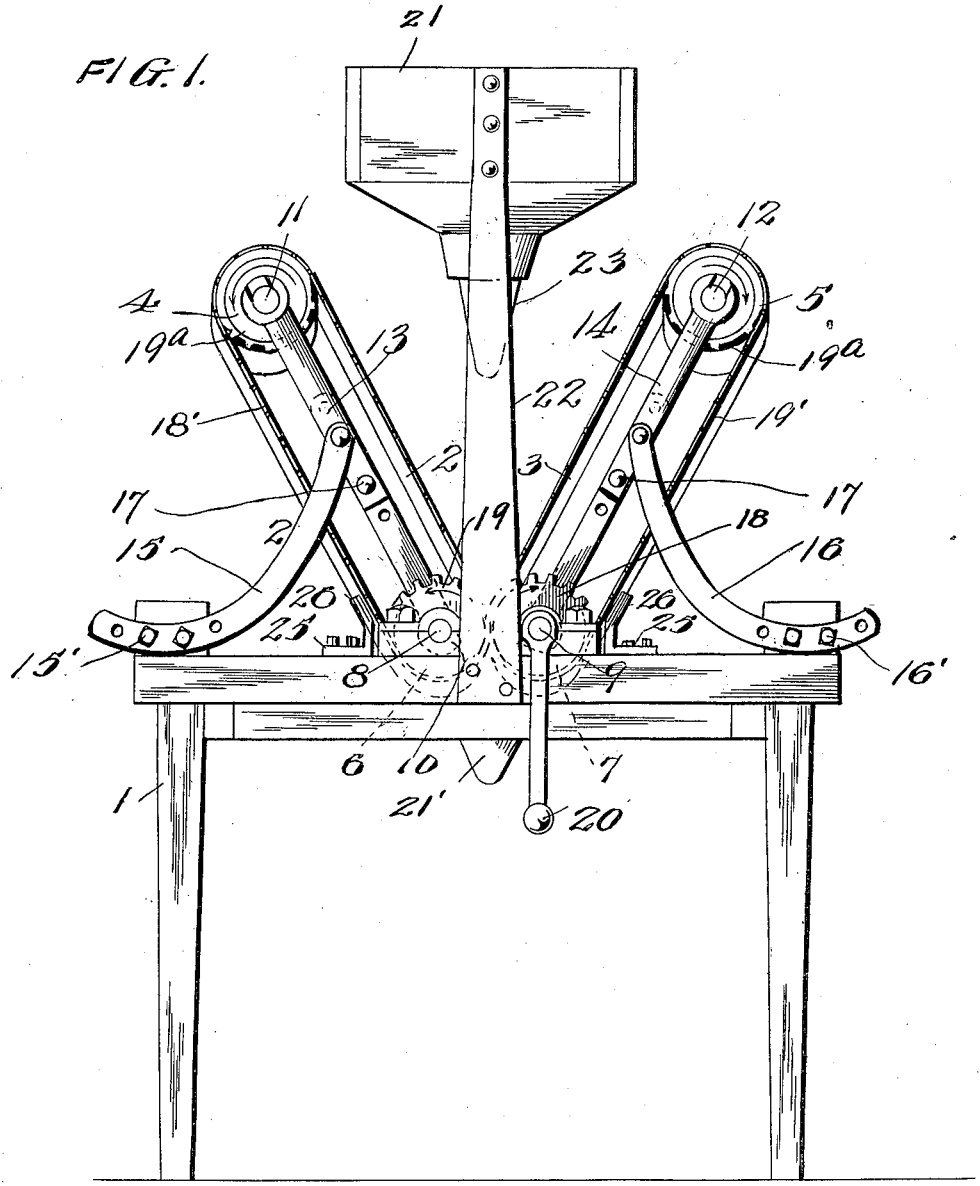
Figure 2:
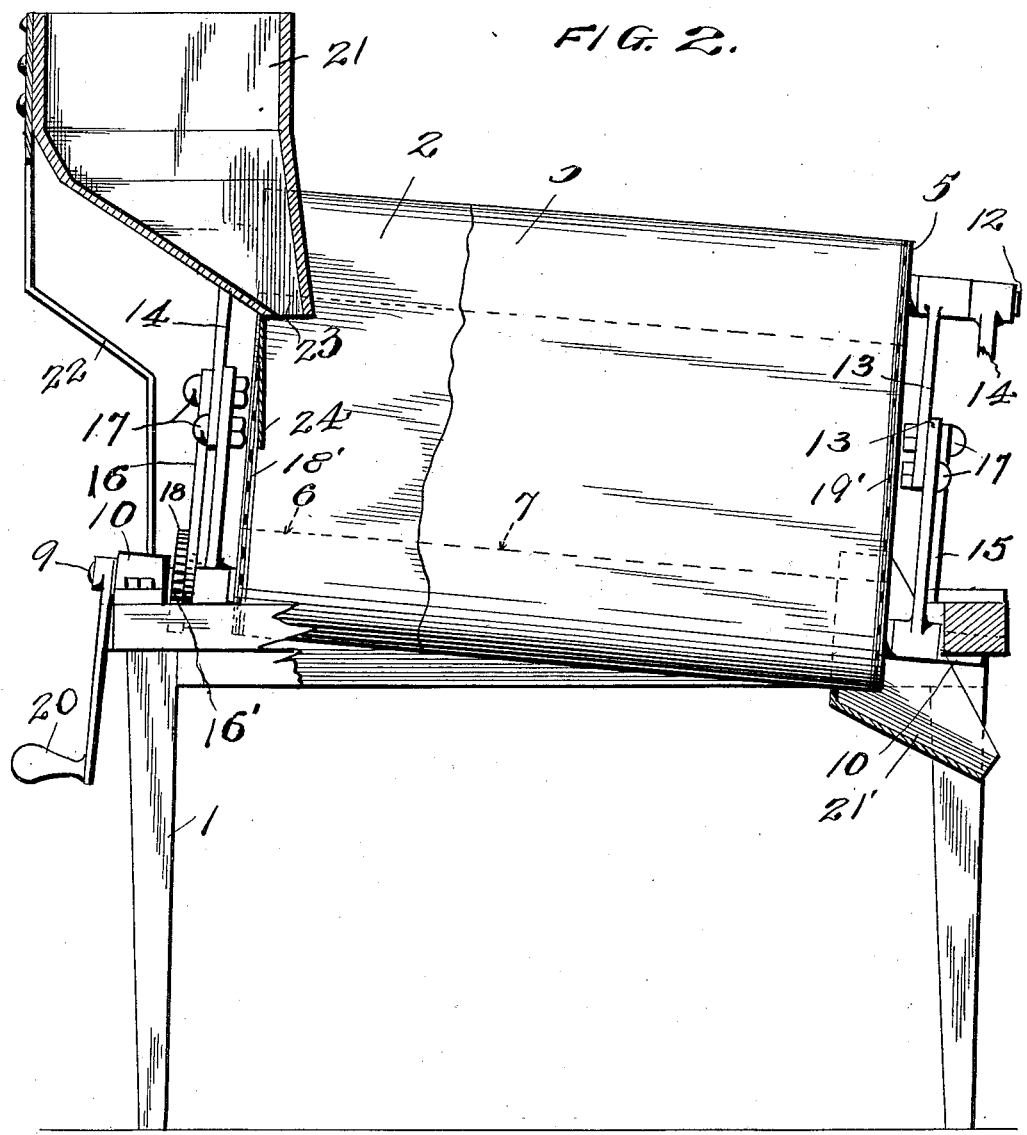

Figure 1 is an end elevation of a machine embodying my invention. Fig. 2 is a side elevation of Fig. 1 parts being broken away and shown in section for convenience of illustration.

In the preferred embodiment of my invention as shown in the drawings I have illustrated a hand-operated machine, supported upon a table or supporting frame 1, but it will of course be understood that the machine may be operated by power other than manual power.

The acutal cleaning mediums are the two endless belts or aprons 2 and 3 which are duplicates and adapted to move about the rotatable rollers, the upper ones being indicated by the numerals 4 and 5 and the lower rollers 6 and 7. The lower rollers 6 and 7 are supported upon the shafts 8 and 9 respectively, and the shafts are supported in bearings 10. An inspection of Fig. 2 will disclose the fact that the shafts 8 and 9 which turn the rollers 6 and 7, as well as the upper shafts 11 and 12 which rotate the upper rollers, are inclined from left downwardly to the right and that the belts or aprons 2 and 3 consequently incline downwardly or slant to the right. The shafts 8 and 9 are journaled, and the rollers 6 and 7 are so arranged, that the two canvas belts or aprons touch, or are in contact with each other, throughout their length as they pass around their respective rollers. This contact of the belts is provided to prevent the passage between the lower rollers, of any seed.

The upper shafts 11 and 12 are each supported from its complementary lower shaft by respective pairs of sectional, extensible bracket arms 13 and 14, the ends of the arms being enlarged and perforated as bearings for the shafts. By means of these extensible brackets the belts may be tightened or loosened, as desired. Each belt is also provided with a pair of movable brackets 15 and 16, secured to the frame by bolts 15' 16' while the two sections of the extensible brackets are held together in adjusted position by bolts 17, one of which bolts also acts as a pivot for the movable bracket arm when the inclination of the belts is varied or adjusted.

The two lower shafts 8 and 9 are caused to rotate synchronously, and the former is driven from the latter through the gear wheels 18 and 19 when the shaft is rotated by crank 20. The upper rollers 4 and 5 are directly driven from the lower rollers by means of sprocket chains 18', and 19' and wheels 19ª.

At the elevated or front end of the machine, a hopper 21 is supported on the bracket 22 from the table, and said hopper is provided with a feed spout 23 for the passage of seed. At the lower end of the inclined rollers an outlet spout 21' for clover seed is provided, and this device is in position to receive the seed as it passes from between the rollers and out at their ends. If required shields, as 25 may be utilized to dispose of the weed seed, and fingers or scrapers 26 may be formed at the upper ends of these shields to scrape the weed seed from the endless belts or aprons.

In operation, the hopper 21 is filled with seed, in which may be mixed clover seed, black plantain seed, buck thorn seed, and other weed seeds of approximately the same size which have come through the screen of the thresher. The rotation of the lower shafts from the handle 20 rotates the endless belts or aprons upwardly and away from each other at the inner side of the machine. The beards of the weed seed cause the weed seeds to become attached to the face of the canvas belts and the weed seeds are thus carried up with the belts and disposed of. The clover seed, however, on account of its smoothness will not stick or attach itself to the canvas, and therefore is tumbled toward the lower end of the machine, the seed being held in suspension from one end of the machine to the other by the continuously upwardly rotating rollers 6 and 7 and the contacting belts thereon. The clover seed finally drops into the outlet 21' and is suitably disposed of. Should the clover seed be damp and have a tendency to stick to the aprons, the brackets 15 and 16 are moved in toward the center of the machine, thereby swinging the supporting arms 13 and 14 and the upper rollers with the belts, toward each other to alter the inclination of the belts, and this adjustment of the parts insures a return or drop of the clover seed from the ascending belts.

Having thus fully described my invention, what I claim as new and desire to secure by Letters Patent is:—

The combination with a pair of belts and their rollers, said belts arranged at an inclination and contacting at their lower ends, of a supporting frame for each belt comprising sectional, perforated, extensible arms, a plurality of bolts securing the sections of each of the arms, an outwardly extended side bracket loosely attached on one of the bolts of each arm, and each of said brackets adjustably secured to a stationary member, so that the inclination of the belts may be varied.

In testimony whereof I affix my signature in presence of two witnesses.

GEORGE M. WEBSTER.

Witnesses:
J. J. BROWN,
JOHN J. BESTICK.

---

Copies of this patent may be obtained for five cents each, by addressing the "Commissioner of Patents, Washington, D. C."